United States Patent
Choi et al.

(10) Patent No.: US 8,112,121 B2
(45) Date of Patent: Feb. 7, 2012

(54) METHOD AND APPARATUS OF PREVENTING MESSAGE INPUT ERROR IN MOBILE COMMUNICATION TERMINAL

(75) Inventors: Kyu-Ok Choi, Seoul (KR); Ki-Tae Lee, Seoul (KR); Hyo-Jin Joung, Seoul (KR); Hee-Woon Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 1601 days.

(21) Appl. No.: 11/482,219

(22) Filed: Jul. 7, 2006

(65) Prior Publication Data

US 2007/0049350 A1  Mar. 1, 2007

(30) Foreign Application Priority Data

Aug. 23, 2005 (KR) .................. 10-2005-0077245

(51) Int. Cl.
*H04M 1/38* (2006.01)
(52) U.S. Cl. ...................... 455/565; 725/135
(58) Field of Classification Search .............. 455/404, 455/91, 86, 566, 12, 525, 524, 70, 575, 59, 455/466, 556; 340/825, 10, 991, 990, 426; 370/349; 375/216; 361/814; 701/213; 395/200; 345/327, 8; 348/557, 808; 354/289; 715/707, 715/810, 710, 814, 817, 700, 764, 815, 794; 725/25; 211/71, 59, 205
See application file for complete search history.

(56) References Cited

U.S. PATENT DOCUMENTS

| | | | |
|---|---|---|---|
| 5,867,729 A * | 2/1999 | Swonk | 710/8 |
| 6,195,569 B1 * | 2/2001 | Frederiksen | 455/566 |
| 6,453,179 B1 * | 9/2002 | Larsen | 455/566 |
| 7,209,955 B1 * | 4/2007 | Major et al. | 709/207 |
| 2002/0080186 A1 * | 6/2002 | Frederiksen | 345/808 |
| 2004/0093376 A1 * | 5/2004 | De Boor et al. | 709/203 |
| 2004/0093582 A1 * | 5/2004 | Segura | 717/102 |
| 2004/0102209 A1 * | 5/2004 | Schonwald et al. | 455/550.1 |

(Continued)

FOREIGN PATENT DOCUMENTS

KR  10-2002-0008256  1/2002

(Continued)

OTHER PUBLICATIONS

KR 2002052113 A—Machine English translation of above Korea patent document. Jul. 2002, Huh Y D.*

(Continued)

*Primary Examiner* — Nick Corsaro
*Assistant Examiner* — Mahendra Patel
(74) *Attorney, Agent, or Firm* — The Farrell Law Firm, P.C.

(57) ABSTRACT

A method and an apparatus f preventing transmitting message input error in a mobile communication terminal are provided. When another event is generated while the transmitting message is being inputted, character input keys are inactivated and an event window is displayed. It is checked whether an ENTER key is pressed while the event window is displayed. If the ENTER key is pressed, the event window and an icon notifying generation of the event are closed. Accordingly, a user of the mobile communication terminal can recognize the generation of the event and prevent transmitting message input error after identifying the generated event.

14 Claims, 3 Drawing Sheets

U.S. PATENT DOCUMENTS

| | | | | |
|---|---|---|---|---|
| 2004/0222964 A1* | 11/2004 | Martinez et al. | ............... | 345/156 |
| 2005/0108775 A1* | 5/2005 | Bachar et al. | ................. | 725/135 |
| 2005/0188312 A1* | 8/2005 | Bocking et al. | ............... | 715/739 |
| 2005/0270292 A1* | 12/2005 | You | ................ | 345/467 |
| 2006/0129806 A1* | 6/2006 | Walmsley | .................... | 713/161 |
| 2007/0071242 A1* | 3/2007 | Murakami et al. | ............ | 380/277 |

FOREIGN PATENT DOCUMENTS

| | | | | |
|---|---|---|---|---|
| KR | 2002052113 A | * | 7/2002 | |
| KR | 2006028168 A | * | 3/2006 | |

OTHER PUBLICATIONS

KR 2006028168 A—Machine English translation of above Korea patent document . Mar. 2006, Choi Y H et al.*

KR 2002052113 A—Basic-Abstract from Derwent database. Jul. 2002, Huh Y D.*

KR 2006028168 A—Basic-Abstract from Derwent database. Mar. 2006, Choi Y H et al.*

* cited by examiner

METHOD AND APPARATUS OF PREVENTING MESSAGE INPUT ERROR IN MOBILE COMMUNICATION TERMINAL

PRIORITY

This application claims priority under 35 U.S.C. §119 to an application entitled "Method of Preventing Message Input Error in Mobile Communication Terminal" filed in the Korean Intellectual Property Office on Aug. 23, 2005 and assigned Serial No. 2005-77245, the contents of which are incorporated herein by reference.

BACKGROUND OF THE INVENTION

1. Field of the Invention

The present invention relates to a method and an apparatus of preventing a message input error in a mobile communication terminal, and particularly to a method of preventing a transmitting message input error generated by other events (e.g., call reception, schedule alarm and message reception) in the mobile communication terminal.

2. Description of the Related Art

Mobile communication terminals are widely used due to their convenient portability and mobility. Manufacturers continue to develop mobile communication terminals having more convenient functions in an effort to secure more users. For example, the mobile communication terminals provide various additional functions such as a phone book function, a game function, a short message function, an internet function, an e-mail function, a morning call function, a MPEG Layer3 function, a digital camera function, etc.

In particular, the "short message" function becomes a popular additional function in mobile communication terminal. There is a tendency that young people prefer the "short message" function to the call communication function. Also, the short message function is becoming more widely used by middle-aged and older people.

As described above, along with increasing the use of the short message function, technologies to keep input of the message secure without errors due to other events are being studied.

FIG. 1 is a flowchart illustrating a procedure of checking a reception message while a transmitting message is being inputted in a conventional mobile communication terminal. Referring to FIG. 1, a Micro-Processor Unit (MPU) of the mobile communication terminal recognizes a transmitting message input by a user's key manipulation. The MPU proceeds to step 103 to check whether a reception message is received.

If the reception message is received, the MPU proceeds to step 105 to display the reception message by using a popup window over an input window of the transmitting message. When displayed the reception message popup window, the MPU proceeds to step 107 to check whether a predetermined key (e.g. a MENU key, an ENTER key, a CANCEL key, one of 3*4 keys, etc. is input.

If the predetermined key is input, the MPU proceeds to step 109 to close the reception message popup window and displays the message input window. After this, the MPU proceeds to step 111 to input the transmitting message.

As described above, if a reception message is received while a transmitting message is being input, the mobile communication terminal displays the reception message by using a popup window. Hereinafter, when a predetermined key (e.g. a MENU key, an ENTER key, a CANCEL key, one of 3*4 keys, etc.) is further input, it recognizes that the reception message is identified and the reception message popup window is closed.

Here, if one of the 3*4 keys is pressed to continue inputting the transmitting message, a first key input is sometimes confusingly recognized not as a reception message identification input but as an input for transmitting a message by the user. Thus, there may be errors in transmitting message input.

Also, if a user does not recognize that another event has been generated while a transmitting message is being inputted, the MPU recognizes that the generated event has been identified by the predetermined key input. Thus, the user may not recognize the event.

SUMMARY OF THE INVENTION

Accordingly, an object of the present invention is to provide a method of preventing a transmitting message input error by another event while the transmitting message is being inputted in a mobile communication terminal.

Another object of the present invention is to provide a method that a user can recognize another event while a transmitting message is being inputted in a mobile communication terminal.

According to one aspect of the present invention for achieving the above objects, in the method of preventing a transmitting message input error in a mobile communication terminal, character input keys are inactivated and the event window is displayed when another event is generated while the transmitting message is being input, and it is checked if the ENTER key is inputted while the event window is displayed. If the ENTER key is inputted, the event window and an icon notifying the event generation are closed.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail to avoid obscuring the present invention with unnecessary detail.

Hereinafter, the present invention will be described with reference to a technology for preventing a transmitting message input error by another event being generated while the transmitting message is being inputted in a mobile communication terminal. A message includes a SMS (Short Message Service) message, an email, a MMS (Multimedia Message System) message, an EMS (Enhanced Message Service) message and the like.

Figure 1:
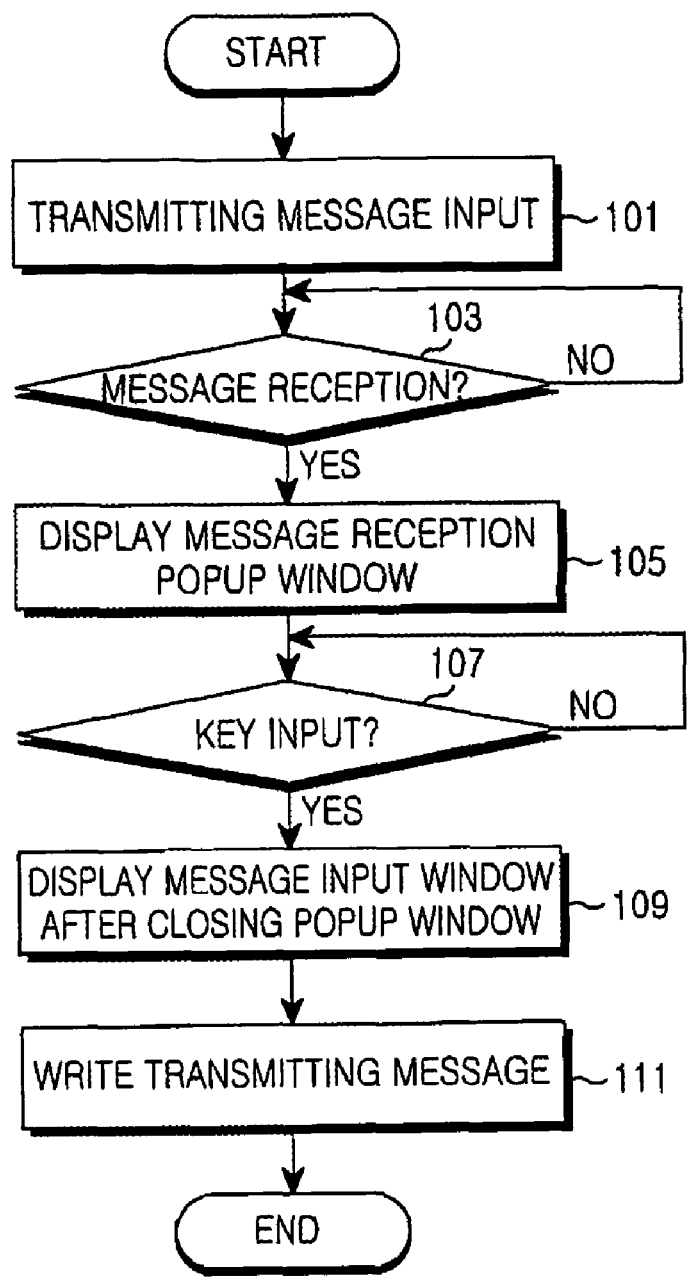
FIG. 1 is a flowchart illustrating a procedure of checking a reception message while a transmitting message is being inputted in a conventional mobile communication terminal.
Figure 2:
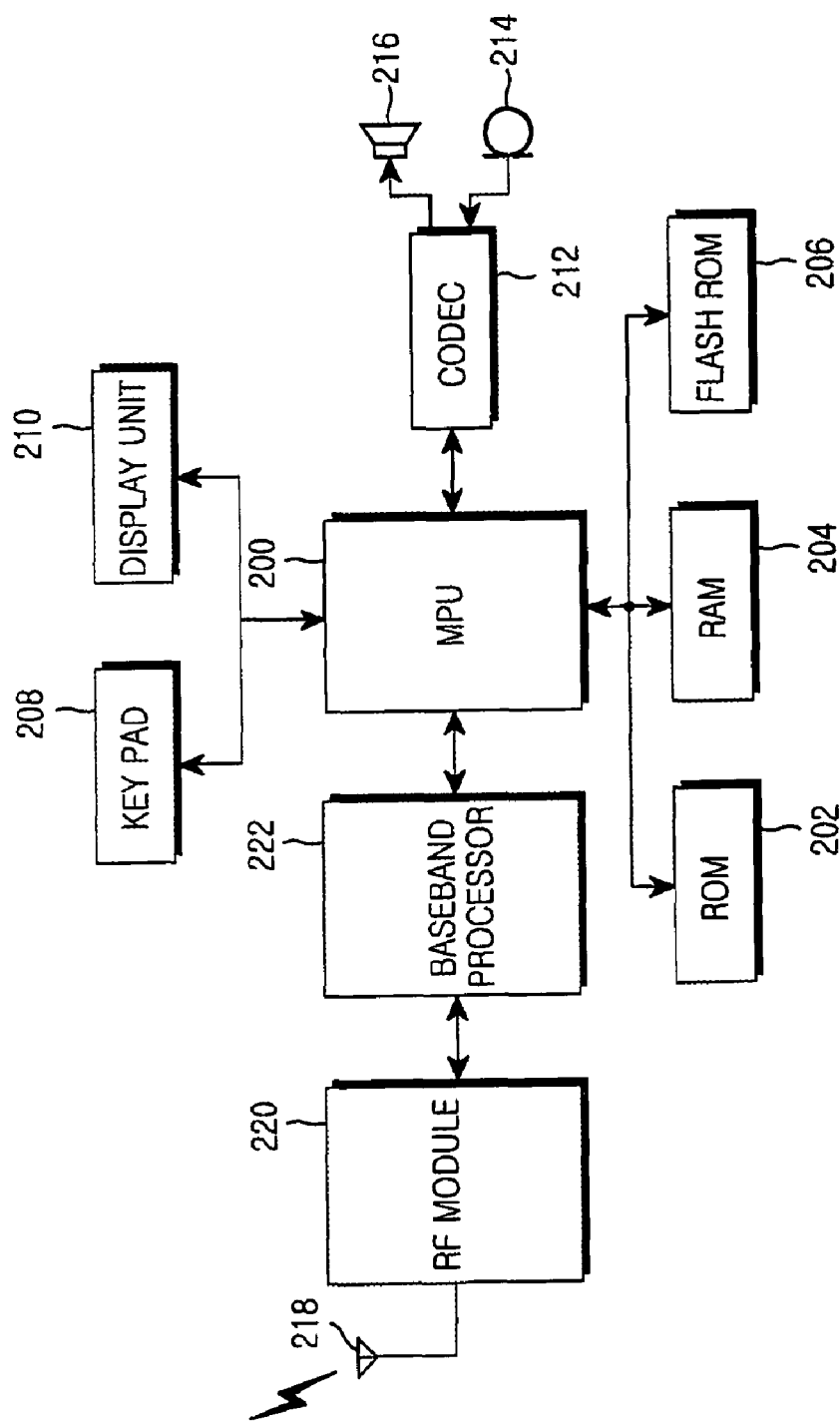
FIG. 2 is a block diagram of mobile communication terminal according to the present invention.

FIG. 2 is a block diagram of a mobile communication terminal according to the present invention. The mobile communication terminal includes a cellular phone, a Personal Communication System (PCS), a Personal Data Assistant (PDA), International Mobile Telecommunication-2000 (IMT2000), and the like. Hereinafter, a general function configuration of the above examples will be described.

Referring to FIG. 2, a Micro-Processor Unit (MPU), a controller, 200 controls an overall operation of the mobile communication terminal. For example, the MPU 200 is responsible for processing and controlling voice communication and data communication. In addition to the typical functions, the MPU 200 processes functions for inactivating character input keys when another event (e.g. telephone call reception, schedule alarm, and message reception, and the like) is generated while a transmitting message is being inputted.

Read Only Memory (ROM) 202 stores a microcode of a program for processing and controlling the MPU and all reference data, in particular, for inactivating character input keys when another event is generated while a transmitting message is being inputted. A Random Access Memory (RAM) 204, which is a working memory of the MPU, stores temporary data being generated while performing all programs. A flash Rom 206 stores various updatable data to be kept, such as a phone book, an outgoing message, and an incoming message.

A key pad 208 includes numeric keys of digits 0-9 and a plurality of function keys, such as a MENU key, a CANCEL (REMOVE) key, an ENTER key, a TALK key, an END key, an internet connection key, navigation keys (▲/▼/◄/►)and character input keys. The key input data corresponding to a key pressed by the user is transmitted to the MPU 200. A display unit 210 displays status information, a restricted number of characters, moving pictures and still pictures and the like. The display unit 210 may be a color LCD (Liquid Crystal Display).

A Coder-Decoder (CODEC) 212 connected to the MPU 200, a microphone 214, and a speaker 216 connected to the CODEC 212 are audio input/output blocks for use in voice communication. The MPU 200 produces PCM data and the CODEC 212 converts the PCM data into analog audio signals. The analog audio signals are outputted through the speaker 216. Also, the CODEC 212 converts analog audio signals received through the microphone 214 into PCM data and provides the MPU 200 to the PCM data.

Radio Frequency (RF) module 220 drops a frequency of an RF signal received through an antenna 218 and provides the RF signal to a baseband processor 222. Also, the RF module 220 increases a frequency of a baseband signal provided from the baseband processor 222, transmits the baseband signals through the antenna 218. The baseband processor 222 processes the baseband signals which are transmitted/received between the RF unit 220 and the MPU 200. For example, for the data transmission, the baseband processor 222 performs channel coding and spreading transmitting data. For the data reception, the baseband processor 222 performs despreading and channel decoding for reception data.

Figure 3:
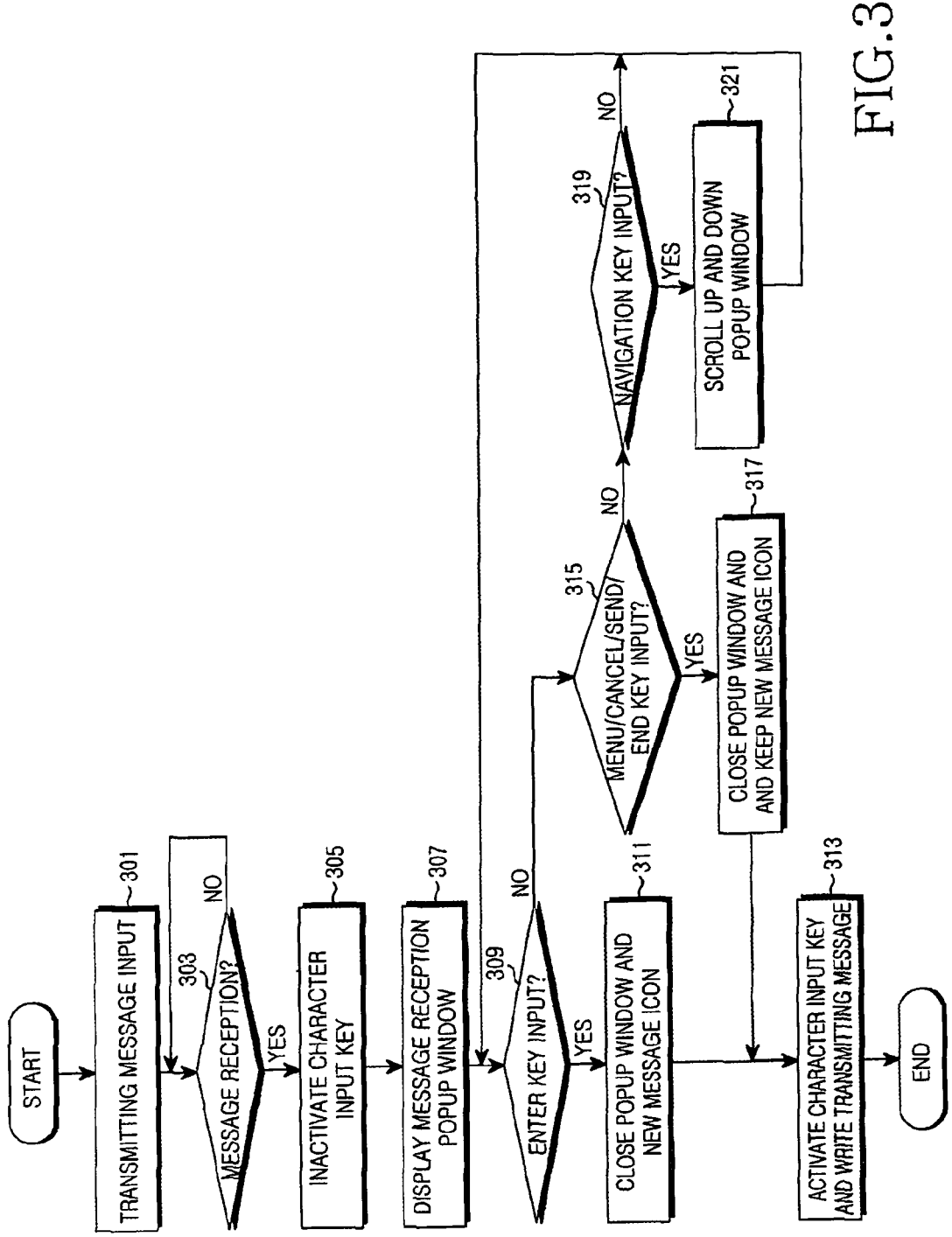
FIG. 3 is a flowchart illustrating a procedure of checking a reception message while a transmitting message is being inputted in a mobile communication terminal according to the present invention.

FIG. 3 is a flowchart illustrating a procedure of checking a reception message while a transmitting message is being inputted in a mobile communication terminal according to the present invention. Referring to FIG. 3, in step 301, the MPU 200 recognizes a message by a user's key manipulation. The MPU proceeds to step 303 to check whether the reception message is received.

If the reception message is received, the MPU 200 proceeds to step 305 to inactivate the character input keys. In step 307, the reception message is displayed by use of a popup window over the transmission message input window. An icon notifying new message reception may also be used. Inactivating of the character input keys prevents a transmitting message input error caused when the reception message popup window disappears upon pressing of the character input keys.

When the reception message popup window is displayed, the MPU 200 proceeds to step 309 to check if an ENTER key is pressed. If the ENTER key is pressed, in step 311, the MPU 200 recognizes that the user has identified the reception message, and then closes the reception message popup window and an icon notifying new message reception. After this, the MPU 200 proceeds to step 313 to activate the character input keys and continually recognizes the transmitting message input in step 301 by the user's key manipulation.

Meanwhile, if the ENTER key is not pressed at step 309, the MPU 200 proceeds to step 315 to check whether any one of a MENU key, a CANCEL key, a SEND key or an END key is pressed. If any one of the MENU key, the CANCEL key, the SEND key or the END key is pressed, the MPU 200 proceeds to step 317 to close the reception message popup window, keeping an icon representing new message reception on. The MPU activates the character input keys in step 313, and then continually receives the transmitting message input in step 301 by the user's key manipulation. After this, the MPU 200 ends this algorithm.

Meanwhile, if none of the MENU key, the CANCEL key, the SEND key or the END key is pressed at step 315, the MPU 200 proceeds to step 319 to check whether a navigation key is pressed. If the navigation key is not pressed, the MPU 200 returns to step 309. If the navigation key is pressed, the MPU 200 proceeds to step 321 to keep the reception message popup window and perform a function of scrolling up and down of the reception message. After this, the character input keys are kept inactivated.

As described above, if another event is generated while a transmitting message is being inputted in the mobile communication terminal, character input keys are inactivated. A separate function is given to the other function keys (an ENTER key, an END key, a SEND key, a CANCEL key or a MENU key). Accordingly, the user of the mobile communication terminal can, with certainty, recognize generation of another event and prevent message input error after identifying the generated event.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method of preventing a transmitting message input error in a mobile communication terminal having a displaying means and a controlling means, comprising the steps of:

inactivating character input keys when another event is generated while the transmitting message is being inputted;

displaying, by the displaying means, another event window;

checking whether an ENTER key is pressed while the event window is displayed;

closing the event window when the ENTER key is pressed;

checking whether a predetermined key other than the ENTER key is pressed while the event window is displayed;

keeping an icon notifying of the generated another event and closing the event window when the predetermined key is pressed; and continuing to input the transmitting message by activating the character input keys after closing the event window, wherein the steps of inactivating, checking, closing, keeping and continuing are performed by the controlling means.

2. The method of claim 1, wherein the message is any one of a Short Message Service (SMS) message, an email, a Multimedia Message System (MMS) message and an Enhanced Message Service (EMS) message.

3. The method of claim 1, wherein the event is any one of telephone call reception, schedule alarm and message reception.

4. The method of claim 1, wherein the predetermined key is any one of a MENU key, a CANCEL key, a SEND key and an END key.

5. The method of claim 1, further comprising:
checking whether a navigation key is pressed while the event window is displayed; and scrolling up and down the event window if the navigation key is pressed.

6. A method of a transmitting message input in a mobile communication terminal having a controlling means, comprising the steps of:

inactivating character input keys if another event is recognized while the transmitting message is being inputted;

displaying another event window;

checking whether a first predetermined key is pressed while the event window is displayed;

closing the event window if the first predetermined key is pressed;

checking whether a second predetermined key is pressed while the event window is displayed;

keeping an icon notifying of the recognized another event and closing the event window if the second predetermined key is pressed; and continuing to input the transmitting message by activating the character input keys after closing the event window, wherein the steps of inactivating, checking, closing, keeping and continuing are performed by the controlling means.

7. The method of claim 6, wherein the message is any one of a Short Message Service (SMS) message, an email, a Multimedia Message System (MMS) message and an Enhanced Message Service (EMS) message.

8. The method of claim 6, wherein the event is any one of telephone call reception, schedule alarm and message reception.

9. The method of claim 6, wherein the second predetermined key is any one of a MENU key, a CANCEL key, a SEND key and an END key.

10. The method of claim 6, further comprising:
checking whether a navigation key is pressed while the event window is displayed; and scrolling up and down the event window if the navigation key is pressed.

11. A mobile communication terminal for preventing a transmitting message input error comprising:

displaying means for displaying another event window; and controlling means for inactivating character input keys if another event is generated while the transmitting message is being inputted, checking whether an ENTER key is pressed while the event window is displayed, closing the event window if the ENTER key is pressed, wherein the controlling means checks whether a predetermined key other than the ENTER key is pressed while the event window is displayed, keeps an icon notifying of the generated another event and closes the event window if the predetermined key is pressed, and continues to input the transmitting message by activating the character input keys after closing the event window.

12. The mobile communication terminal of claim 11, wherein the message is any one of a Short Message Service (SMS) message, an email, a Multimedia Message System (MMS) message and an Enhanced Message Service (EMS) message.

13. A mobile communication terminal for transmitting message input, comprising:

displaying means for displaying another event window; and controlling means for inactivating character input keys if another event is recognized while the transmitting message is being inputted, checking whether a first predetermined key is pressed while the event window is displayed, closing the event window if the first predetermined key is pressed, wherein the controlling means checks whether a second predetermined key is pressed while the event window is displayed, keeps an icon notifying of the recognized another event and closes the event window if the second predetermined key is pressed, and continues to input the transmitting message by activating the character input keys after closing the event window.

14. The mobile communication terminal of claim 13, wherein the message is any one of a Short Message Service (SMS) message, an email, a Multimedia Message System (MMS) message and an Enhanced Message Service (EMS) message.

* * * * *